April 28, 1936.　　　A. N. SCOTT　　　2,038,684

VEHICLE CHAIN

Filed May 18, 1934

INVENTOR
ALLEN. N. SCOTT
BY *J. D. O'Connell*
ATTORNEY

Patented Apr. 28, 1936

2,038,684

UNITED STATES PATENT OFFICE 2,038,684

VEHICLE CHAIN

Allen N. Scott, Montreal West, Quebec, Canada, assignor of one-half to Jules R. Timmins, Montreal, Quebec, Canada Application May 18, 1934, Serial No. 726,349

2 Claims. (Cl. 152—14)

This invention relates to anti-skid attachments for vehicle wheels and particularly to "creeping" cross chain attachments of the kind described in my prior United States Patent No. 1,824,633, granted Sept. 22, 1931.

According to my prior patent, a series of endless cross chains are connected to a pair of side chains by large circular links through which the cross chains are threaded to form triangles having at least one leg extending across the wheel tread at an oblique angle to the direction of travel. When thus arranged the cross chains "creep" through the circular links and across the wheel tread so that the links of each cross chain are successively brought into engagement with the road surface. The wear on the cross chains is thus equally shared by the component links so that the life of the cross chains is materially prolonged. Another feature is that the cross chains, in passing through the circular links, are turned over so that their opposite faces are alternately presented to the road surface. Uniform distribution of wear on the circumference of the circular links is also achieved by arranging these links so that they have a "creeping" or turning movement with respect to both the side chains and the cross chains.

The particular object of the present invention is the provision of simple and inexpensive means whereby a single cross chain of the "creeping" type may be easily and quickly applied to a wheel without employing the side chains of my prior patent.

Proceeding now to a more detailed description of this invention reference will be had to the accompanying drawing, wherein—

Figure 1:
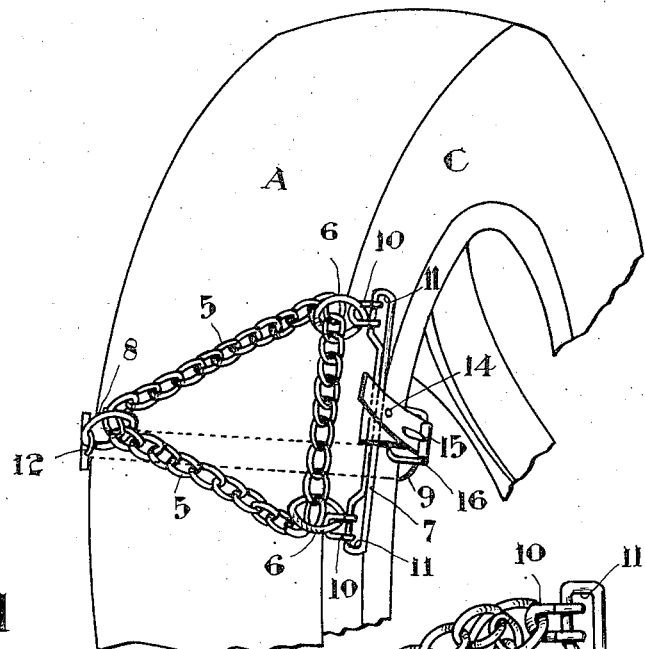
Fig. 1 is a fragmentary perspective view of a wheel equipped with my improved anti-skid attachment.
Figure 2:
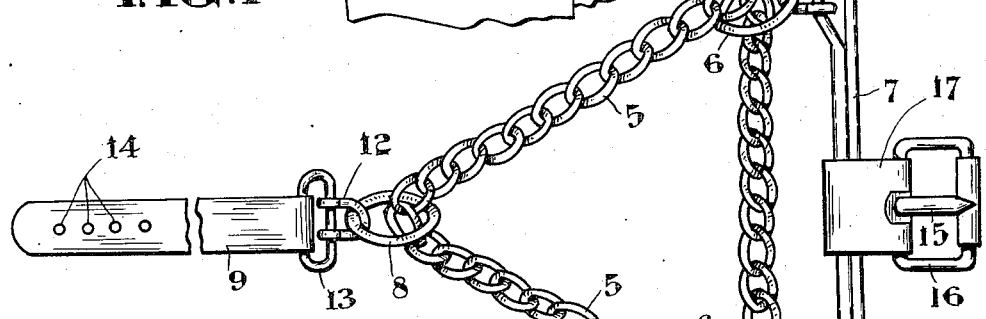
Fig. 2 is a plan view of said attachment.

In the construction shown in Figs. 1 and 2, an endless cross chain 5 is threaded through two large circular links 6 attached to opposite ends of a bar 7 and through a similar link 8 attached to a strap 9. The links 6 are free to rotate through the clips 10 by which they are attached to eyelets 11 at the ends of the bar 7. The link 8 is similarly free to rotate through the clip 12 by which it is attached to a metal loop 13 at one end of the strap 9. Adjacent its opposite end strap 9 is provided with openings 14 to receive the tongue 15 of a buckle 16 that is fastened to the central portion of the bar 7 by a strap 17.

The application of the cross chain to a wheel is illustrated in Fig. 1. The chain is first placed across the tire tread A with the bar 7 in contact with one side of the tire casing. The strap 9 is then passed around the wheel rim C and fastened to the buckle 16 so that the chain is tensioned by the pull of the links 6 and 8 and assumes the form of a triangle, the sides of which extend across the tire tread at an oblique angle to the direction of wheel travel. Owing to this oblique disposition of the tread crossing portions the chain is caused to gradually creep through the circular links so that the wear on the cross chains is equally shared by the component links. The component links of the cross chains are also turned, as they pass through the large circular links, to alternately present their opposite sides to the road surface and thus are not worn through as quickly as they would be in the absence of such turning movement. The links 6 and 8 are a sufficiently loose fit in the clips 10 and 12 to be capable of a "creeping" or turning movement so that the wear on the links is distributed over the circumference thereof instead of being concentrated at one particular point.

Figure 3:
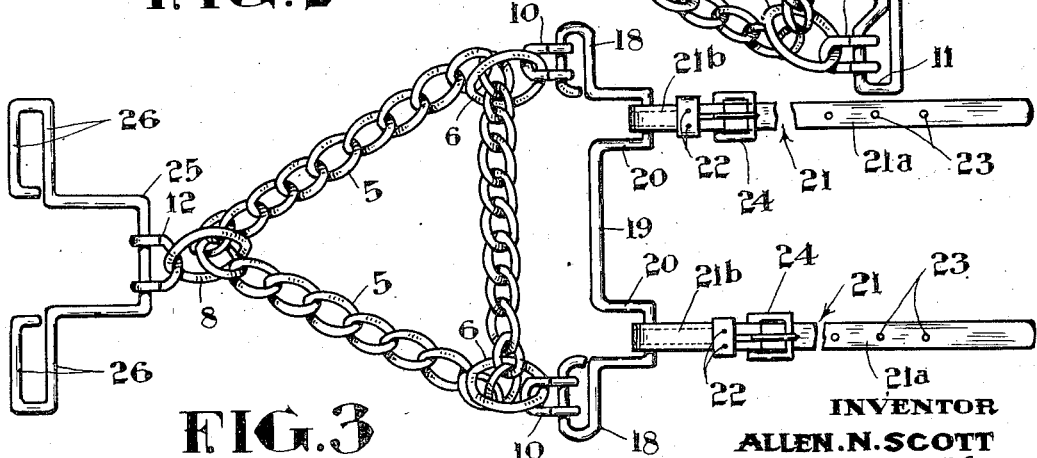
Fig. 3 is a view similar to Fig. 1 but showing a slight modification.

In Fig. 3 the links 6 are fastened, by their clips 10, to eyelets 18 at opposite ends of a bar 19. This bar is provided with two U-shaped bends 20 for the attachment of a pair of straps 21. In the present instance each strap is passed around the bight of one of the U-shaped bends 20 to provide the opposing portions 21a and 21b which are fastened together, as at 22, to prevent relative slippage. Each strap portion 21a is provided with openings 23 to receive the tongue of a buckle 24 carried by the free end of the remaining strap portion 21b. The remaining link 8, appearing in Fig. 3, is fastened by its clip 12, to a U-shaped bar 25 having the free terminals of its side arms bent to provide strap receiving loops 26. In applying the attachment of Fig. 3, the chain 5 is first stretched across the tire tread with the bars 19 and 25 positioned at opposite sides of the tire. The portions 21a of the straps 21 are passed across the inside of the wheel rim and through the loops 26 of the bar 25, then bent back upon themselves and fastened to the buckles 24.

In each of the attachments described in the foregoing the bar to which the links 6 are attached serves as a spacer for holding these links separated so that the cross chain is caused to assume a triangular form when tensioned by the pull of the freely slidable link 8 during fastening of the chain securing straps.

Having thus described what I now consider to be the preferred embodiment of my invention it will be understood that various modifications may be resorted to within the scope and spirit of the appended claims. For example, the buckles employed for securing the chain attaching straps around the wheel rim may be replaced by strap clamps or other equivalent strap fastening means.

Having thus described my invention, what I claim is:—

1. An anti-skid attachment for vehicle wheels comprising a pair of bars of unequal length adapted to be disposed against opposite sides of a tire casing or wheel adjacent the tread, a pair of spaced links attached to the longer bar, a third link attached to the remaining or shorter bar, an endless chain threaded loosely through said links so as to be capable of independent creeping movement, said chain constituting an anti-skid element adapted to be stretched across the tread of the tire casing or wheel, and complementary fastening means carried by the third link and said longer bar for holding the chain in place across a wheel or tire tread.

2. An anti-skid attachment for vehicle wheels comprising a spacer member, a pair of chain guides at opposite ends of said member, an endless chain loosely threaded through said guides and capable of "creeping" movement with respect thereto, a link freely slidable on said chain and fastening means for holding the chain in place across the wheel or tire tread, said fastening means comprising strap and buckle members attached to said spacer member and a bar attached to said link and provided with loops adapted to receive said strap members therethrough.

ALLEN N. SCOTT.